(12) United States Patent
Hu

(10) Patent No.: US 9,272,331 B2
(45) Date of Patent: Mar. 1, 2016

(54) PERMEABLE POROUS COMPOSITE

(75) Inventor: Bo Hu, Greensburg, PA (US)

(73) Assignee: HOGANAS AB, Hoganas (SE)

( * ) Notice: Subject to any disclaimer, the term of this patent is extended or adjusted under 35 U.S.C. 154(b) by 644 days.

(21) Appl. No.: 13/388,493

(22) PCT Filed: Aug. 4, 2010

(86) PCT No.: PCT/EP2010/061351
§ 371 (c)(1),
(2), (4) Date: Mar. 7, 2012

(87) PCT Pub. No.: WO2011/015601
PCT Pub. Date: Feb. 10, 2011

(65) Prior Publication Data
US 2012/0160775 A1    Jun. 28, 2012

Related U.S. Application Data

(60) Provisional application No. 61/231,568, filed on Aug. 5, 2009.

(30) Foreign Application Priority Data

Aug. 5, 2009   (SE) ..................................... 0950579

(51) Int. Cl.
*B22F 1/00* (2006.01)
*C02F 1/28* (2006.01)
(Continued)

(52) U.S. Cl.
CPC ......... *B22F 1/0003* (2013.01); *B01J 20/28004* (2013.01); *B01J 20/28042* (2013.01); *B01J 20/28057* (2013.01); *B01J 20/3035* (2013.01); *B01J 20/3078* (2013.01); *B22F 9/04* (2013.01); *C02F 1/288* (2013.01); *C02F 1/58* (2013.01); *C22C 1/08* (2013.01); *C22C 33/0228* (2013.01); *B01J 2220/42* (2013.01); *B01J 2220/58* (2013.01); *B22F 2998/10* (2013.01);
(Continued)

(58) Field of Classification Search
None
See application file for complete search history.

(56) References Cited

U.S. PATENT DOCUMENTS 2,074,185 A * 3/1937 Langhammer et al. ......... 419/27
2,198,254 A * 4/1940 Koehring ...................... 428/553
(Continued)

FOREIGN PATENT DOCUMENTS

EP    1273371 A2    1/2003
GB    339645 A    12/1930
(Continued)

OTHER PUBLICATIONS

Data Sheet by Graphit Kropfmuhl entitled "Graphite in Powder Metallurgy", (2014).*
(Continued)

*Primary Examiner* — Joseph D Anthony
(74) *Attorney, Agent, or Firm* — Buchanan Ingersoll & Roone P.C.

(57) ABSTRACT

A porous and permeable composite for treatment of contaminated fluids, said composite including a body of iron particles and 0.01-10% by weight of at least one functional ingredient distributed and locked in the pores and cavities of the iron body. Also, methods of making a permeable porous composite for water treatment. Also, use of a permeable porous composite for reducing the content of contaminants in a fluid, wherein said fluid is allowed to pass through the permeable composite.

15 Claims, 7 Drawing Sheets

(51) Int. Cl.
*C02F 1/58* (2006.01)
*B01J 20/20* (2006.01)
*B01J 20/28* (2006.01)
*B01J 20/30* (2006.01)
*B22F 9/04* (2006.01)
*C22C 1/08* (2006.01)
*C22C 33/02* (2006.01)
*C02F 101/20* (2006.01)

(52) U.S. Cl.
CPC ............ *B22F2999/00* (2013.01); *C02F 1/281* (2013.01); *C02F 1/283* (2013.01); *C02F 2101/20* (2013.01)

(56) References Cited

U.S. PATENT DOCUMENTS

| | | | |
|---|---|---|---|
| 2,214,104 A * | 9/1940 | Hildabolt et al. | 428/550 |
| 2,239,800 A * | 4/1941 | Vogt et al. | 419/2 |
| 2,763,519 A * | 9/1956 | Thomson | 384/279 |
| 2,817,601 A * | 12/1957 | Shigley | 427/367 |
| 3,307,924 A * | 3/1967 | Michael | 428/570 |
| 5,534,154 A | 7/1996 | Gillham | |
| 6,465,390 B1 * | 10/2002 | Hakata et al. | 502/182 |
| 6,827,757 B2 | 12/2004 | Ozaki et al. | |
| 2003/0083195 A1 | 5/2003 | Nakamaru et al. | |
| 2007/0241063 A1 | 10/2007 | St-Laurent et al. | |
| 2008/0134835 A1 * | 6/2008 | Johansson et al. | 75/252 |
| 2008/0302209 A1 * | 12/2008 | Knutsson et al. | 75/252 |
| 2013/0140250 A1 * | 6/2013 | Gore et al. | 210/807 |
| 2013/0316898 A1 * | 11/2013 | De Leij et al. | 502/406 |

FOREIGN PATENT DOCUMENTS

| | | |
|---|---|---|
| JP | 2003-105313 A | 4/2003 |
| JP | 2003-339902 A | 12/2003 |
| JP | 2004-58051 A | 2/2004 |

OTHER PUBLICATIONS

International Search Report (PCT/ISA/210) issued on Nov. 28, 2011, by European Patent Office as the International Searching Authority for International Application No. PCT/EP2010/061351.

Written Opinion (PCT/ISA/237) issued on Nov. 28, 2011, by European Patent Office as the International Searching Authority for International Application No. PCT/EP2010/061351.

M. Slesar et al., Microstructure Formation and Fracture Processes in Fe—C Systems Sintered in Nitrogen, Powder Metallurgy Progress, vol. 2, 2002, No. 4, pp. 199-210.

Herbert Danninger et al., "Dissolution of Different Graphite Grades During Sintering of PM Steels" *Materials Chemistry and Physics* vol. 67, pp. 72-77 (2001).

English Translation of Japanese Office Action dated Jun. 27, 2014, issued in corresponding Japanese Patent Application No. 2012-523327. (3 pgs).

* cited by examiner

Powder form
(<10mm)

Granular/Pellet form
(10-100mm)

Compacted form
(>100mm)

Column: φ25xH200 mm
Composite: φ25xH20 mm
water: 100 ml
air pressure: 0 and 0.035 MPa Figure 4A. Examples of embodiments according to the invention

| Method | Process Steps |
|---|---|
| (1) | Mixing<br>[Chem. Reduced Fe-powder (10mm-10µm) +<br>Functional ingredient (<20µm, pref. <10µm)] |
| (2) | Heat treatment<br>[Fe-powder (2mm-1 µm, pref. 1mm-1µm, most pref. 0.5mm-1µm), 300-1200°C]<br>↓<br>Sizing<br>[to coarser porous powder]<br>↓<br>Mixing<br>[Porous Fe- powder +Functional ingredient (<10µm, pref. <5µm)] |
| (3) | Mixing<br>[Fe-powder (10mm-10µm) +Functional ingredient (<20µm, pref. <10µm)]<br>↓<br>Compaction<br>[<1000MPa, pref. <600MPa to compacted body (blocks, granules, pellets) (2.5-7g/cm$^3$, pref. 4-6g/cm$^3$)]<br>↓<br>Sizing (optional)<br>[to desired size] |
| (4) | Mixing<br>[Fe-powder (10mm-10µm, pref.5mm-20µm, most pre. 2mm-45µm) +Functional ingredient (<20µm, pref. <10µm)]<br>↓<br>Heat treatment<br>[300-1200°C]<br>↓<br>Sizing<br>[to desired size] |

Figure 4B.

| (5) | Mixing [Fe-powder (10mm-10µm) +Functional ingredient (<20µm, pref. <10µm)] ↓ Compaction [<1000MPa, pref. <600MPa to compacted body (blocks, granules, pellets) <7g/cm$^3$] ↓ Heat treatment [300-1200°C] ↓ Sizing (optional) [to desired size] |
|---|---|
| (6) | Compaction [Fe-powder (2mm-1 µm, pref. 1mm-1µm, most pref. 0.5mm-1µm), <1000MPa to compacted body (blocks, granules, pellets) (2.5-7g/cm$^3$, or 4-6g/cm$^3$)] ↓ Sizing [to particles 10mm-10µm] ↓ Mixing [Sized material +Functional ingredient (<10µm, pref. <5µm)] |
| (7) | Compaction [Fe-powder (2mm-1 µm, pref. 1mm-1µm, most pref. 0.5mm-1µm), <1000MPa to compacted body (blocks, granules, pellets) (2.5-7g/cm$^3$, or 4-6g/cm$^3$)] ↓ Heat treatment [300-1200°C] ↓ Sizing [to particles 10mm-10µm, pref. 5mm-20µm, most pref. 2mm-45µm] ↓ Mixing [Sized material +Functional ingredient (<10µm, pref. <5µm)] |

Figure 5 : Porous iron particle
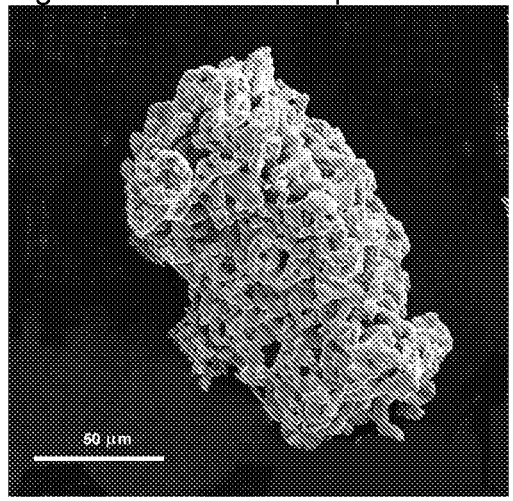
Figure 6: Solid iron particle
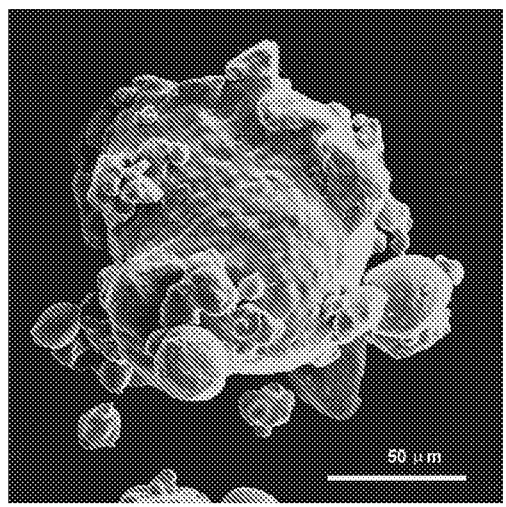

Figure 7: Functional ingredients (here activated carbon (AC) particles) in free form locked into the pores of porous iron particales through mechanically mixing process
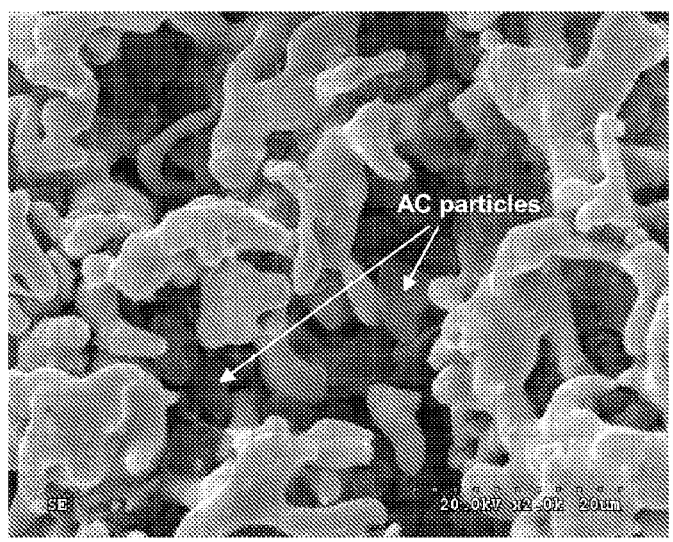

PERMEABLE POROUS COMPOSITE

FIELD OF THE INVENTION

The present invention concerns a composite containing iron particles and at least one functional ingredient. The particles of the functional ingredients are well distributed in a permeable porous iron body. The present invention also concerns the method of making the composite, and the use of the composite for purifying fluids. The composite can be manufactured into powder form, pellet form and various other forms by using powder metallurgical processes.

BACKGROUND OF THE INVENTION

Toxic inorganic/organic substances in various water sources have to be reduced below regulated levels before the water goes into drinking water systems or is released into recipients.

Nitrate ($NO_3^-$) is the most common inorganic contaminant found in groundwater in the areas where agriculture activities occur heavily. Nitrates usually come from fertilizers, used in farming and gardening in order to provide the plants and shrubs with nutrients.

Other contaminants which may be generated from such activities are phosphates ($PO_4^{3-}$) and traces of pesticides such as atrazine. Accumulation of fertilizers is a problem as they can go through the soil and contaminate ground water systems. Both shallow water wells and deep water wells can be affected.

Toxic metals such as arsenic (As), chromium (Cr), whereof its oxidation state +6 ($Cr^{VI}$) is regarded as most harmful, lead (Pb), mercury (Hg), cadmium (Cd), selenium (Se), etc, other substances as chlorinated hydrocarbons and other organic substances, sometimes measured as Total Organic Carbon (TOC) are generated either from natural origins or from industrial or farming activities.

In order to reach acceptable levels of contaminants in drinking water, several processes are currently used.

Reverse osmosis is based on the process of osmosis. This involves the selective movement of water from one side of a membrane to the other. A major disadvantage of reverse osmosis is the large amount of contaminated wastewater generated, which can be as much as 50 to 90% of the incoming water. Over time, clogging of the membrane pores occurs as iron, salts and bacteria accumulate on the membrane surface. This not only affects the performance of the reverse osmosis system, but can also cause bacterial contamination of the water. This technique is also very energy consuming.

Distillation processes are also used. The nitrate and other minerals remain concentrated in the boiling tank. The disadvantages of this process include the amount of energy consumed (to boil the water), limited capacity and constant maintenance.

The ion exchange process percolates water through bead-like spherical resin materials (ion-exchange resins). Ions in the water are exchanged for other ions fixed to the beads. The two most common ion-exchange methods are softening and deionization. Ion exchange techniques also generate hazardous brine waste that needs to be deposited. Deionization (DI) systems effectively remove ions, but they do not effectively remove most organics or microorganisms. Microorganisms can attach to the resins, providing a culture media for rapid bacterial growth and subsequent pyrogen generation. This technique has a low initial capital investment but a high long-term operational cost.

US patent publication No. 2007/0241063A1 describes a process for treating water contaminated with a volatile organic compound with iron powder granules containing iron, carbon and oxygen. The carbon addition to the iron powder granules in US2007/0241063A1 is made during the atomization process and are not subjected to any mixing process. This is commonly known as a "pre-alloy" process in the field of powder metallurgy.

U.S. Pat. No. 5,534,154 describes a procedure for treating contaminated water by passing the water containing contaminant in solution through a permeable body of treatment material comprising particles of an adsorptive material physically mixed with particles of metal. The iron metal particles mentioned in the patent are iron fillings generally in solid granular form. The procedure requires a negative Eh voltage which in turn demands oxygen exclusion.

U.S. Pat. No. 6,827,757 describes a magnetite-iron based composite with very small average particle size of 0.05-10 μm.

EP1273371A2 describes an iron powder adapted to remediate selected media by dehalogenating halogenated hydrocarbons in the media comprising iron powder particles and inorganic compounds. Said inorganic compounds should have a very low electric resistivity, preferably selected from the group consisting of Ca, Ti, V and Cr. Said inorganic compounds should be present on at least a portion of the surface of each particle.

SUMMARY OF THE INVENTION

An object of the invention is to provide permeable porous composites comprising an iron body suitable for contaminant purification of fluids, especially liquids, such as water. The composites can be applied in fluid treatments such as drinking water treatment, waste water treatment such as municipal and industrial waste water treatment, and also for soil remediation. Further the permeable porous composite has functional ingredients in their free form well distributed and locked in the pores of an iron body. The term 'locked in' refers to the effect of attaching functional ingredient particles to the iron body in such a way that they will not be removed from the iron body by the fluid during the purification process. Another object of the invention is to provide the method of making the iron-based composite.

Yet another object of the invention is to provide a method for purifying liquids, such as water, from contaminants with no generation of hazardous waste products.

Yet another preferred object of the invention is to provide a product and method for reducing nitrates in water, especially water to be used as drinking water.

The present invention relates to a porous and permeable composite for treatment of contaminated fluids characterized in that said composite comprises a body of iron particles and 0.01-10% by weight of at least one functional ingredient distributed and locked in the pores and cavities of the iron body. A body of iron particles is to be interpreted as a body of particles as they are in original state or the iron particles have been formed into a different shape (an iron body).

A permeable porous composite, comprising 0.01%-10% by weight of at least one functional ingredient, preferably selected from the group consisting of carbon containing compounds, calcium containing compounds, sodium containing compounds, iron containing compounds, titanium containing compounds and aluminium containing compounds; preferably said carbon containing compounds are selected from graphite, activated carbon (AC) and coke; said iron containing compounds are selected from ferric or ferrous sulphate, ferric oxides and ferric hydroxides; said titanium containing compounds is titania; and said aluminium containing compounds are selected from alumina, activated alumina and aluminium silicates such as zeolites; said sodium containing compound is soda; said calcium containing compounds is lime; preferably said functional ingredient is from the group of graphite, activated carbon, coke, activated alumina and zeolites, most preferably from the group of graphite, activated carbon, coke. Optionally may further functional ingredients outside the mentioned group be selected, depending on the contaminant to be processed. All functional ingredients should be locked in and well distributed in the permeable porous iron body.

The present invention also relates to methods of making a permeable porous composite e.g. for water treatment. Said composite can be manufactured into various forms, such as powder, chip, flake, block or pellet, using common powder metallurgical technologies.

A method for manufacturing a porous and permeable composite for treatment of contaminated fluids, comprising the steps of; mechanically mixing iron particles representing an iron body with at least one functional ingredient, which is present in an amount of 0.01-10% by weight, until the functional ingredient is distributed by mechanical forces into the iron body and locked; optionally heat treating the iron body, with or without said at least one functional ingredient, at a temperature between 300 and 1200° C. in an inert or reducing atmosphere; optionally compacting the iron body, with or without said at least one functional ingredient, into a compacted body having a green density equal to or below 7.0 g/cm³; and/or optionally sizing said iron body, with or without said at least one functional ingredient, wherein said steps can be carried out in optional order.

The present invention also relates to use of a permeable porous composite according to any preceding claims for reducing the content of contaminants in a fluid, wherein said fluid is allowed to pass through the permeable composite. Said fluid may be a water containing fluid, preferably ground water, river water, industrial waste water, civic waste water and/or surface water. Said fluid may be used as drinking water after purification treatment according to the present invention. Said contaminants may be selected from the group consisting of nitrate, nitrite, heavy metals, such as As, Pb, Hg, Cd, Se, Cr and hexavalent Cr, other toxic inorganic substances and toxic organic compounds; or combinations thereof; preferably nitrate and/or nitrite.

DETAILED DESCRIPTION OF THE PRESENT INVENTION

The permeable and porous composite according to the present invention comprises a mixture of porous iron, and 0.01-10%, preferably 0.05-8%, preferably 0.1-5% by weight of at least one functional ingredient which might be chosen from coke, graphite, activated carbon, ferric oxides, ferric hydroxides, titania, alumina, activated alumina, zeolites, lime, soda, ferric or ferrous sulphate, preferably from the group of coke, graphite, activated carbon, activated alumina and zeolites. Depending of the pore and cavity size of the permeable porous iron, the functional ingredient may have in some embodiments of the invention a particle size less than 20 µm, preferably less than 10 µm, in other embodiments the particle size of the functional ingredients may be less than 10 µm preferably less than 5 µm. The particle size being above about 0.02 µm.

The use of the wording "permeable" as disclosed herein is to be interpreted as a composite or a iron powder or body being constructed so that it is permeated or penetrated, especially by liquids or gases. The use of the wording "porous" as disclosed herein is to be interpreted as a composite or a iron powder or body being constructed so that it is admitting the passage of gas or liquid through pores or interstices. Thus, the permeable and porous composite according to the present invention comprises the at least one functional ingredient located in pores and cavities of the composite. The iron part of the composite, the iron body, could be made of iron powder or iron particles which themselves are porous. Otherwise, the iron body, the porous and permeable iron structure, is prepared using compaction and/or heat and optional sizing of iron powder or particles.

The iron particles or powder are/is mixed with the functional ingredient resulting in a composite according to the invention. Also, the iron powder can be mixed with the functional ingredient(s) before being compacted and/or heat treated, optionally followed by sizing into a desired size. Alternatively, the iron powder can be compacted and/or heat treated, optionally followed by sizing into a desired size, before being mixed with the functional ingredient(s).

All functional ingredients should be locked in and well distributed in the permeable porous iron body or iron structure. The functional ingredients are in free from, i.e. still in their original state, and thus not altered in any way like alloyed or coated to the iron body. Apart from obtaining a combined technical effect from the adsorptive capacity of the functional ingredient and the redox ability from the porous iron a synergetic effect is obtained when combining the porous iron with the functional ingredient locked into the pores of the iron. The term functional ingredient should be interpreted as an additive which main function is to enhance the purification of fluids, by providing a synergetic effect with the iron particles. This synergetic effect is evident by the remarkable high efficiency of the new permeable porous composite for removal of multiple contaminants for example nitrate and arsenic in combination in water. An additionally advantage with the method for reducing contaminants in fluids according to the present invention is, in contrast to methods such as conventional ion exchange is that no hazardous waste is generated by the method.

In one embodiment porous iron powder particles having a particle size range between 10 mm and 10 µm, preferably between 5 mm and 20 µm and most preferably between 2 mm and 45 µm is preferably used. Finer iron powder may also be used and can in these cases be turned into coarser porous particles by known methods such as compaction and sizing; heat treatment and sizing; or compaction, heat treatment and sizing. The iron powders used in these cases may have particle size range between 2 mm and 1 µm, preferably between 1 mm and 1 µm, and preferably 0.5 mm and 1 µm. Having too small average particle size increases the oxidation rate of the iron particles to too high levels, meaning a loss of process efficiency. Depending on the application, i.e. type of fluid to be treated and type of contaminants, different iron powders and different functional ingredients could be chosen in order to obtain optimal efficiency. For reducing nitrate content in drinking water, chemically reduced iron powder has shown to be one preferred embodiment of the present invention.

Preferably, the iron powder has a content of Fe of more than 90% iron, preferably more than 95%. Iron powder particles used may originate directly from atomization of molten iron i.e. gas atomization and water atomization of molten iron, chemical reduction of iron oxides such as CO-reduction or H2-reduction of iron oxides and thereafter being mixed with the functional ingredients optionally followed by other processes steps, such as compaction, heat treatment, sizing or combinations thereof.

The iron particles or iron powder used may be iron particles having a particle size range between 10 mm and 10 µm, preferably between 5 mm and 20 µm and most preferably between 2 mm and 45 µm but is not to be interpreted as limited to these particle sizes. If the iron particles are going to be subjected to compaction and/or heat smaller particle sizes could be used e.g. between 2 mm and 1 µm, preferably between 1 mm and 1 µm, and preferably 0.5 mm and 1 µm. Further, in another embodiment the iron particles are preferably porous iron particles, i.e. the particles are themselves porous.

The functional ingredient is added to the iron body, i.e iron particles or iron particle structure, in an amount of with 0.01%-10% preferably 0.05-8%, preferably 0.1-5% by weight of at least one functional ingredient. The particle size of the functional ingredients may be less than less than 20 µm, preferably less than 10 µm, and in some cases also preferably less than 5 µm e.g. preferably 0.01-20 µm, preferably 0.01-10 µm, preferably 0.02-10 µm, preferably 0.02-5 µm.

Mixing of the iron powder or particles with the at least one functional ingredient is performed by mechanical mixing in such a way that the small functional particles are forced into the internal porosity of the permeable iron particle structure and become locked in the structure.

Compaction of a disclosed material is done at pressures below 1000 MPa, preferably below 600 MPa, e.g. 10-1000 MPa or 20-600 MPa, to achieve a compacted density of about or less than 7.0 g/cm$^3$ to form desired shapes, such as blocks, granules or pellets. Preferably the compacted density is between 2.5-7.0 g/cm$^3$, preferably 4-6 g/cm$^3$ depending of type of iron powder used. The compaction process forces, if a functional ingredient is present, the free smaller functional ingredient particles to be locked inside the iron body. An iron powder having irregular shape and a porous structure can provide high green strength to the permeable porous composite thus allowing lower density promoting higher permeability.

Embodiments requiring heating treatment to achieve a porous and permeable composite according to the invention would involve temperatures below 1200° C., below 1000° C., or below 800° C. depending on the types iron powder and functional ingredients used in a reducing or inert atmosphere. The heat treatment temperature being above 300° C., preferably above 400° C. Temperature intervals of interest are especially 300-1200° C., 400-1200° C., 300-1000° C., 400-1000° C., 300-800° C., 400-800° C., 300-700° C., 400-700° C., 300-600° C., 400-600° C., 300-500° C. and 400-500° C. The heat treatment according to the present invention induces bonding between iron particles, so-called thermal bonding. If a functional ingredient is present, the heat treatment temperature should also be chosen so that the functional ingredient is kept in its original state, e.g. not diffusing into the iron structure. Also, the heat treatment process forces the free smaller functional ingredient particles to become locked inside the permeable porous iron body.

Sizing of a disclosed iron material into particles before an addition of the at least one functional ingredient preferably results in a particles size range between 10 mm and 10 µm, preferably between 5 mm and 20 µm and most preferably between 2 mm and 45 µm.

The mixing step may be performed in an ordinary mixer, such as a Z-blade mixer, cone mixer, ribbon mixer or high speed mixer for a period of time between 0.5 min och 8 hours, preferably 1 minute to 5 hours or 30 min to 3 hours. Compaction may be performed in any suitable compaction equipment such as a ordinary uniaxial press at a pressure below 1 000 MPa or in high velocity compaction machine. Heat treatment may be performed in a batch oven or a continuous mesh belt furnace at a temperature of 300-1200° C. for a period between 5 minutes and 24 hours, e.g. 30 min to 18 hours, 1-12 h, 2-8 h. Sizing or gently grinding may be performed in any suitable equipment giving a particle size between 10 mm and 10 µm, preferably between 5 mm and 20 µm and most preferably between 2 mm and 45 µm.

(1) In one embodiment of the present invention chemically reduced porous iron particles having a particle size range between 10 mm and 10 µm are mechanically mixed with at least one functional ingredient. The particle size of the functional ingredients may be less than 10 µm, preferably less than 5 µm. The mechanical mixing is performed in such a way that the small particles are forced into the internal porosity of the porous iron particles, such as sponge-like reduced iron powder, and become locked in the structure.

(2) In another embodiment of the present invention, iron powder particles, having particle size range between 2 mm and 1 µm, preferably between 1 mm and 1 µm, and preferably 0.5 mm and 1 µm, are subjected to heat treatment at 300-1200° C., depending on particle size, the types iron powder and functional ingredients, in a reducing or inert atmosphere. After heat treatment the resulting powder cake is sized into porous iron powder with desired size. The heat treated and sized powder is then mechanically mixed with 0.01-10% by weight of at least one functional ingredient. The particle size of the functional ingredients may be less than 10 µm, preferably less than 5 µm. The mechanical mixing is performed in such a way that the small functional particles are forced into the internal porosity of the iron particles, and become locked in the structure.

(3) In yet another embodiment iron particles having a particle size range between 10 µm and 10 mm are mixed with 0.01-10% by weight of at least one functional ingredient. The particle size of the functional ingredients being less than 20 µm, preferably less than 10 µm. Said mixture is to subjected to be compaction at pressures below 1000 MPa, preferably below 600 MPa, to achieve a compacted density between 2.5-7.0 g/cm$^3$, preferably 4-6 g/cm$^3$ depending of type iron powder used, into desired shapes such as blocks, granules or pellets. The compacted composite may alternatively be sized into desired size. The compaction process forces the free smaller functional particles to be locked inside the porous iron body. An iron powder having irregular shape and a porous structure can provide high green strength to the permeable porous composite thus allowing lower density promoting higher permeability.

(4) In yet another embodiment iron particles having a particle size range above between 10 mm and 10 µm, preferably between 5 mm and 20 µm and most preferably between 2 mm and 45 µm are mixed with 0.01%-10%, preferably 0.1-5% by weight of at least one functional ingredient. The particle size of the functional ingredient being less than 20 µm, preferably less than 10 µm. Said mixture is subjected to heat treatment at 300-1200° C. in a reducing or inert atmosphere. After heat treatment the resulting powder cake is sized into desired size. The heat treatment process forces the free smaller particles to be locked inside the porous iron powder.

(5) In yet another embodiment iron particles having a particle size range above between 10 mm and 10 µm are mixed with 0.01%-10% by weight of at least one functional ingredient. The particle size of the functional ingredient being less than 20 µm, preferably less than 10 µm. Said mixture is subjected to powder compaction at pressures below 1000

MPa to achieve a compacted density of less than 7.0 g/cm³ to form desired shapes, such as blocks, granules or pellets. The compaction process forces the free smaller particles to be locked inside the iron body. Said compact is then subjected to heat treatment at 300-1200° C., depending on the particle size, types iron powder and functional ingredients used, in a reducing or inert atmosphere. The heat treatment temperature should be also chosen so that the functional ingredient is kept in its original state, e.g. not diffusing into the iron structure. The compacted and heat treated composite may alternatively be sized into desired size.

(6) In an alternative embodiment iron particles having a particle size range between 2 mm and 1 µm, preferably between 1 mm and 1 µm, and preferably 0.5 mm and 1 µm is subjected to compaction at pressures below 1000 MPa to achieve a compacted density between than 2.5-7.0 g/cm³, or 4-6 g/cm³ depending of type iron powder used, to form desired shapes, such as blocks, granules or pellets. The compacted body being then sized into particles having a particles size range between 10 mm and 10 µm. The sized material are mechanically mixed with 0.01%-10% by weight of at least one functional ingredient. The particle size of the functional ingredient may be less than 10 µm, preferably less than 5 µm. The mechanical mixing is performed in such a way that the small functional particles are forced into the internal porosity of the porous iron particles and become locked in the structure.

(7) In an alternative embodiment iron particles having a particle size range between 2 mm and 1 µm, preferably between 1 mm and 1 µm, and preferably 0.5 mm and 1 µm is subjected to compaction at pressures below 1000 MPa to achieve a compacted density between than 2.5-7.0 g/cm³, or 4-6 g/cm³ depending of type iron powder used, to form desired shapes, such as blocks, granules or pellets. The compacted body is subjected to heat treatment at 300-1200° C., depending on the particle size, types iron powder and functional ingredients used, in a reducing or inert atmosphere. The heat treated material being then sized into particles having a particles size range between 10 mm and 10 µm, preferably between 5 mm and 20 µm, and most preferably between 2 mm and 45 µm. The sized material are mechanically mixed with 0.01%-10% by weight of at least one functional ingredient. The particle size of the functional ingredient may be less than 10 µm, preferably be less than 5 µm. The mechanical mixing is performed in such a way that the small functional particles are forced into the internal porosity of the porous iron particles and become locked in the structure.

In yet another embodiment a method for producing a porous and permeable composite involves a H2-reduced iron powder (porous particles) having a particle size range between 45 µm and 850 µm in size, and having a Fe-content of at least 90% by weight of the iron powder which is mechanically mixed with a functional ingredient chosen from graphite and/or activated carbon, wherein the functional ingredient is locked into the pores of the porous iron particles. The composite comprises a body of H2-reduced iron powder of porous particles having a particle size range between 45 µm and 850 µm in size and having a Fe-content of at least 90% by weight of the iron powder, and the functional ingredient is chosen from graphite and/or activated carbon.

In another embodiment of the invention a method for reducing the content of contaminants in fluids is disclosed comprising the steps of obtaining a permeable porous composite as described above and allowing the contaminated fluid to pass through the permeable composite thus reducing the content of the contaminants.

The permeable porous composite could be placed inside a container connected to the supply system of the fluid to be treated. Such containers could be placed serial or parallel and connected to additional containers containing other known substances for reducing the content of harmful substances in the fluid. The composite according to the invention preferably has a specific surface area above 0.2, preferably above 0.5 and most preferably above 1 m²/g as measured by BET (Brunauer, Emmett and Teller, 1938).

The permeable porous composite according to the present invention should have a permeability, expressed as porosity ranging from 11 to 68%, preferably 23-50%, regardless of embodiment.

In one embodiment of the present invention the permeable porous composite consists of a mixture of porous iron, and 0.01%-10%, preferably 0.1-5% by weight of at least one functional ingredient.

One embodiment of the invention is to apply the composite to drinking water treatment, waste water (municipal and industrial) treatment and soil remediation. The permeable porous composite according to the invention is designed for optimal treatment of nitrates and nitrites and toxic inorganic and organic contaminants.

No direct hazardous waste products are generated when using the permeable porous composite according to the invention for water treatment.

The generated by product, i.e. the used porous composite, can be used in other industries, for instance as raw material for the steel industry. The composite according to the invention demonstrates greater and more consistent performance in removal of nitrate and other contaminants during water treatment and results in no direct hazardous waste.

DRAWINGS

Figure 1:
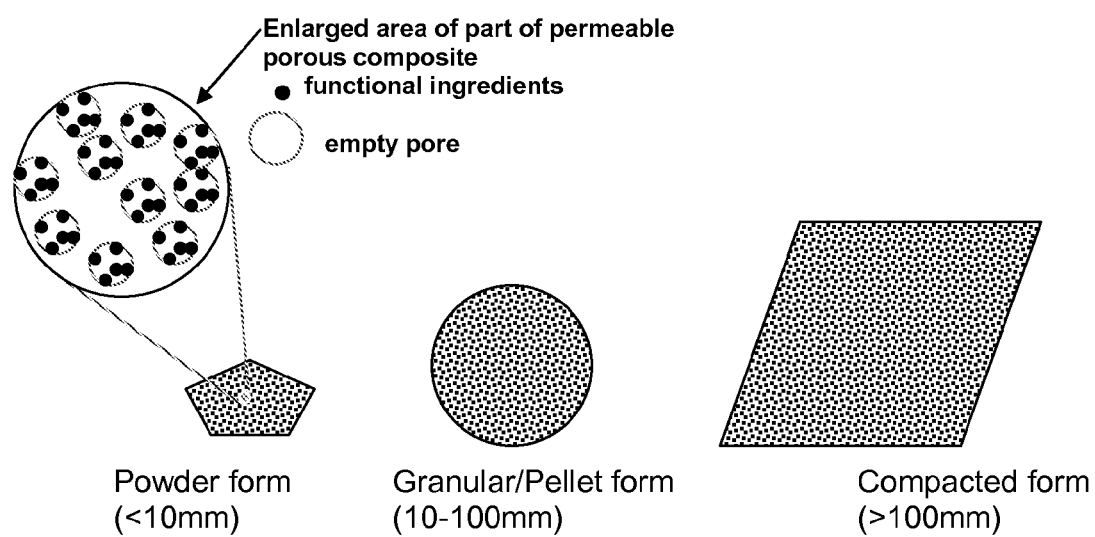
FIG. 1 shows a schematic drawing of permeable porous composites according to the invention and different shapes, which the composite could be made into.
Figure 2:
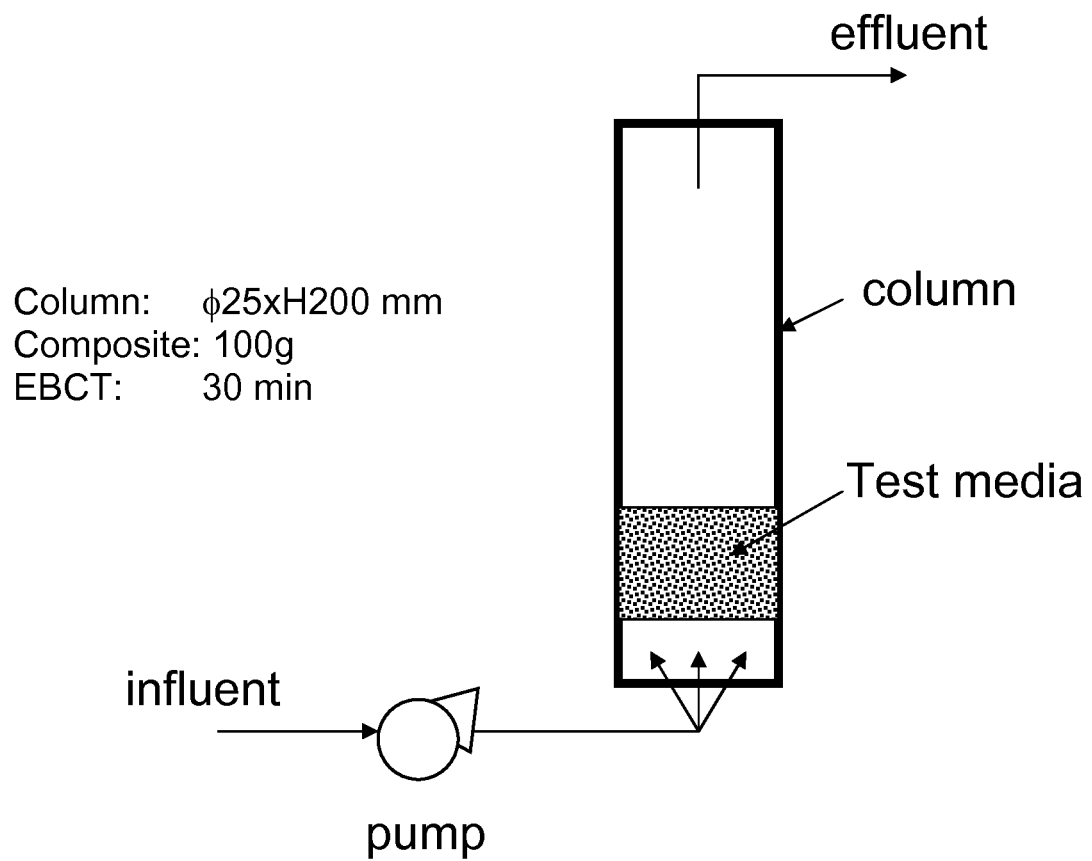
FIG. 2 shows a schematic drawing of a column used for evaluating the performance of the permeable porous composite according to the invention.
Figure 3:
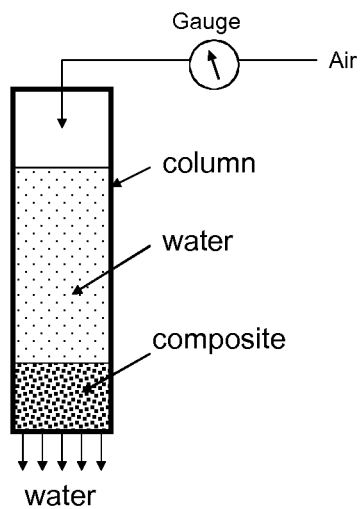

FIG. 3 shows a schematic drawing of an apparatus used for evaluating permeability of the permeable porous composite according to the invention. Using minimal air pressure to assist water to overcome the surface tension of water on the composite in order to determine the max. (min.) permeable density (porosity). The composite was compacted into different density (porosity). Measurement of the amount of water passed through the composite by time under pressure or no pressure.

FIGS. 4A-B: Examples of production methods according to the invention

FIG. 5: Picture of porous iron particle

FIG. 6: Picture of solid iron particle

FIG. 7: Picture showing functional ingredients (here activated carbon (AC) particles) in free form locked into the pores of porous iron particles through mechanically mixing process. The porous iron particle structure have a lighter colour than the encased AC particles.

EXAMPLES

The following materials were used as functional materials;

TABLE 1

| Name | Main constituent % by weight | Average particle size D50, μm | Specific surface area (BET) m²/g |
|---|---|---|---|
| Activated carbon, AC | 95.4% C | 3.8 | 680 |
| Graphite A | 99.4% C | 2.71 | 250 |
| Graphite B | 99.0% C | 5.5 | 10 |
| Ferric oxide | 99.1% $Fe_2O_3$ | 0.75 | 5 |

Used Functional Ingredients

Example 1

A sample of natural occurring water, ground water from Martinsberg, Pa., USA, was used. Chemical analysis is shown in table 2. The test was performed by pumping the water into a column having a test material, as shown in FIG. 3. The empty bed contact time, EBCT, was 25 minutes. The effluent water was analyzed with regards to contaminants after certain time intervals. The content of contaminants at 0 hours is equal to the content in the non treated water (influent).

TABLE 2

| | |
|---|---|
| Nitrate (as N) [mg/l] | 22.7 |
| pH | 7.33 |
| Alkalinity [mg/l] | 220 |
| Acidity [mg/l] | <1.0 |
| Total hardness [mg/l] | 531 |
| Conductivity [mS/cm] | 2680 |

Different materials were tested as permeable materials referring to their ability to reduce nitrate concentration in the solution. The following materials were tested;

Material 1; A commercial available activated carbon granular, AC, 0.6×2.4 mm size having a specific surface area of 600 m²/g as measured by BET method.

Material 2; A commercial available solid non porous atomized iron powder, having a particle size less than 200 μm, having a carbon content of less than 0.1% by weight dissolved in the iron matrix, and a specific surface area of less than 0.1 m²/g as measured according to BET.

Material 3; A commercial available solid non porous iron aggregate having a carbon content of 3% by weight dissolved in the iron matrix, a specific surface area of 1.2 m²/g as measured according to BET and a size of 0.3×5 mm.

Material 4; A permeable porous composite according to the present invention having a specific surface area of 2.7 m²/g as measured according to BET. The composite being produced by mixing graphite A with a porous hydrogen reduced iron powder having a particle size between 10-850 μm, mean particle size of about 250 μm for a period of 30 min until the graphite was forced into the pores of the iron powder. The amount of graphite A in said composite was 1% by weight of the composite.

Material 5: A permeable porous composite according to the present invention having a specific surface area of 6.7 m²/g as measured according to BET. The composite being produced by activated alumina with a porous hydrogen reduced iron powder having a particle size between 10-850 μm, mean particle size of about 250 μm for a period of 30 min until the alumina was forced into the pores of the iron powder. The amount of activated alumina in said composite was 4% by weight of the composite.

Material 6: A permeable porous composite according to the present invention having a specific surface area of 2.0 m²/g as measured according to BET. The composite being produced by zeolite with a porous hydrogen reduced iron powder having a particle size between 10-850 μm, mean particle size of about 250 μm for a period of 30 min until the zeolite was forced into the pores of the iron powder. The amount of zeolite in said composite was 4% by weight of the composite.

The test was continuously conducted during a period of 72 hours for each material. The following table shows the concentration of nitrate ions in effluent for each material. The concentration of nitrate was measured by an ion selective electrode and expressed as nitrogen content in mg/l.

TABLE 3

| | Material 1 - comparative example | | Material 2 - comparative example | | Material 3 - comparative example | | Material 4 - permeable porous composite - according to the invention (graphite A) | | Material 5 - permeable porous composite - according to the invention (activated alumina) | | Material 6 - permeable porous composite - according to the invention (Zeolite) | |
|---|---|---|---|---|---|---|---|---|---|---|---|---|
| Hours | mg/l | % reduction | mg/l | % reduction | mg/l | % reduction | mg/l | % reduction | mg/l | % reduction | mg/l | % reduction |
| 0 | 22.4 | 0 | 22.4 | 0 | 22.4 | 0 | 22.4 | 0 | 22.6 | 0 | 22.6 | 0 |
| 3 | 12.3 | 45.1 | 21.0 | 6.3 | 22.8 | 0 | 3.6 | 83.9 | 16.8 | 25.7 | 21.3 | 5.8 |
| 6 | 15.6 | 30.4 | 22.5 | 0 | 22.4 | 0 | 1.9 | 91.5 | 13.1 | 42.0 | 19.7 | 12.8 |
| 9 | 18.4 | 17.9 | 22.9 | 0 | 22.0 | 1.8 | 1.2 | 94.6 | 12.4 | 45.1 | 12.3 | 45.6 |
| 12 | 20.2 | 4.6 | 22.6 | 0 | 22.1 | 1.3 | 0.9 | 96.0 | 3.6 | 84.1 | 7.6 | 66.5 |
| 24 | 21.3 | 4.9 | 21.7 | 3.1 | 21.8 | 2.7 | 1.2 | 94.6 | 2.6 | 88.3 | 6.5 | 71.3 |
| 28 | 22.1 | 1.3 | 22.4 | 0 | 20.4 | 8.9 | 0.9 | 96.0 | 2.2 | 90.1 | 5.0 | 77.8 |
| 32 | 21.5 | 4.1 | 21.4 | 4.5 | 20.0 | 10.7 | 0.7 | 96.9 | 1.8 | 91.9 | 2.9 | 87.2 |
| 48 | 22.4 | 0 | 22.3 | 0.4 | 19.2 | 14.3 | 0.9 | 96.0 | 2.0 | 91.3 | 2.2 | 90.1 |
| 52 | 22.4 | 0 | 21.6 | 3.6 | 16.7 | 25.4 | 1.1 | 95.1 | 1.7 | 92.5 | 2.0 | 91.3 |
| 56 | 22.4 | 0 | 21.9 | 2.2 | 16.3 | 27.2 | 1.9 | 91.5 | 1.7 | 92.5 | 1.9 | 91.8 |
| 72 | 22.4 | 0 | 22.0 | 1.8 | 13.0 | 41.9 | 1.8 | 92.0 | 1.8 | 91.9 | 1.8 | 91.9 |

As can be seen from table 3 above the permeable porous composites according to the invention are able to reduce the nitrate content during the whole test period and above 90% from between 3 to 48 hours of running, depending on the functional ingredient used. Material 1 reduces the nitrate concentration with about 18-45% up to 9 hours. Material 2 shows hardly any reducing effect and material 3 reduces the nitrate content less than 50 during the test period and only start to work after a substantial time period.

Example 2

Various permeable porous composites according to the invention, were tested according to the method described in example 1, with regards to there nitrate reducing ability. The water to be used was taken from the same source. The permeable porous composites were prepared by mixing different functional ingredients with a porous iron powder obtained by hydrogen reduction of iron oxides and having a particle size between 10-850 µm, mean particle size of about 250 µm for a period of 30 minutes until the functional ingredient was well distributed and locked into the pores of the permeable porous iron.

In composite 1 1% by weight of AC was used as functional ingredient. The specific surface area of composite 1 was 5.7 m$^2$/g as measured by BET.

In composite 2 2% by weight of AC was used as functional ingredient. The specific surface area of composite 2 was 12.8 m$^2$/g as measured by BET.

In composite 3 1% by weight of graphite A was used as functional ingredient. The specific surface area of composite 3 was 2.7 m$^2$/g as measured by BET.

In composite 4 2% by weight of graphite B and 3% by weight of ferric oxide, Fe$_2$O$_3$ were used as functional ingredients. The specific surface area of composite 1 was 0.6 m$^2$/g as measured by BET.

The concentration of nitrate was measured by an ion selective electrode and expressed as nitrogen content in mg/l.

As can be seen from table 4 the permeable porous composites 1-3 has a capacity of removal of nitrate with more than 90% after 9-12 hours. Composite 4 reduces the nitrate content to a level of about 70% after 32 hours and up to 56 hours of testing.

Example 3

This example shows the ability for a permeable porous composite according to the invention to reduce multiple contaminants in ground water. The test was performed according to example 1 with the exception that Arsenic, As, phosphate, PO$_4^{3-}$, and hexavalant chromium, Cr$^{VI}$, was added, spiked, to the water prior to testing.

The permeable material was the permeable porous composite no 2 used in example 2.

The concentration of nitrate was measured by an ion selective electrode and expressed as nitrogen content in mg/l. The concentration of phosphate and hexavalent Cr was measured by a colometric method and the concentration of arsenic by atomic absorption analyzer, AAS. The concentration of phosphate was expressed as P mg/l. Also concentrations of As and Cr is expressed in mg/l.

TABLE 4

| Hours | Composite 1 - according to the invention | | Composite 2 - according to the invention | | Composite 3 - according to the invention | | Composite 4 - according to the invention | |
|---|---|---|---|---|---|---|---|---|
| | N mg/l | % reduction | N mg/l | % reduction | N mg/l | % reduction | N mg/l | % reduction |
| 0 | 22.4 | 0 | 22.4 | 0 | 22.4 | 0 | 22.7 | 0 |
| 3 | 13.1 | 41.5 | 12.0 | 46.4 | 13.6 | 39.3 | 21.4 | 5.7 |
| 6 | 11.8 | 47.3 | 9.8 | 56.3 | 1.9 | 91.5 | 20.4 | 10.1 |
| 9 | 7.8 | 65.2 | 5.7 | 74.6 | 1.2 | 94.6 | 19.6 | 13.7 |
| 12 | 1.7 | 92.4 | 1.3 | 94.2 | 0.9 | 96.0 | 17.6 | 22.5 |
| 24 | 1.6 | 92.9 | 1.0 | 95.5 | 1.2 | 94.6 | 9.6 | 57.7 |
| 28 | 2.2 | 90.2 | 1.5 | 93.3 | 0.9 | 96.0 | 7.3 | 67.8 |
| 32 | 2.2 | 90.2 | 1.2 | 94.6 | 0.7 | 96.6 | 6.5 | 71.4 |
| 48 | 2.5 | 88.8 | 1.0 | 95.5 | 0.9 | 96.0 | 4.1 | 81.9 |
| 52 | 2.1 | 90.6 | 0.9 | 96.0 | 1.1 | 95.1 | 4.1 | 81.9 |
| 56 | 2.2 | 90.2 | 1.7 | 92.4 | 1.9 | 91.5 | 6.3 | 72.2 |
| 72 | 1.3 | 94.2 | 1.0 | 95.5 | 1.8 | 92.0 | 9.1 | 59.9 |

TABLE 5

| Hours | Nitrate (N) mg/l | % reduction | As mg/l | % reduction | PO$_4^{3-}$ (P) mg/l | % reduction | Cr$^{VI}$ mg/l | % reduction |
|---|---|---|---|---|---|---|---|---|
| 0 | 23.1 | 0 | 1.260 | 0 | 0.285 | 0 | 0.273 | 0 |
| 3 | 5.01 | 78.3 | 0.007 | 99.4 | 0.064 | 77.5 | 0.031 | 88.6 |
| 6 | 2.30 | 90.0 | 0.007 | 99.4 | 0.053 | 81.4 | 0.021 | 92.3 |
| 9 | 1.44 | 93.8 | 0.002 | 99.8 | 0.053 | 81.4 | 0.027 | 90.1 |
| 12 | 1.46 | 93.7 | 0.003 | 99.8 | 0.048 | 83.2 | 0.023 | 91.6 |
| 24 | 0.49 | 97.9 | 0.006 | 99.5 | 0.058 | 89.6 | 0.013 | 95.2 |
| 28 | 0.61 | 97.4 | 0.009 | 99.3 | 0.061 | 78.6 | 0.012 | 95.6 |
| 32 | 0.80 | 96.5 | 0.008 | 99.4 | 0.059 | 79.3 | 0.011 | 96.0 |
| 48 | 1.00 | 95.7 | 0.007 | 99.4 | 0.073 | 74.4 | 0.014 | 94.9 |

As can be seen from table 5 the permeable porous composite according to the invention has the capacity of removal multiple combinations of contaminants.

Example 4

This example shows the ability for a permeable porous composite according to the invention, composite 2 in example 2, to reduce multiple contaminants in ground water compared to material 3 in example 1.

The test was performed according to example 1 with the exception that Arsenic, As was added, spiked, to the water prior to testing.

The concentration of nitrate was measured by an ion selective electrode and expressed as nitrogen content in mg/l and the concentration of arsenic was measured by AAS.

TABLE 6

| | Non porous iron powder + 3% graphite - comparative example | | | | Composite 2 - according to the invention | | | |
|---|---|---|---|---|---|---|---|---|
| Hours | Nitrate (N) mg/l | % reduction | As mg/l | % reduction | Nitrate (N) mg/l | % reduction | As mg/l | % reduction |
| 0 | 22.5 | 0 | 5.300 | 0 | 23.0 | 0 | 5.400 | 0 |
| 3 | 21.1 | 6.2 | 0.022 | 99.6 | 3.9 | 83.0 | 0.014 | 99.7 |
| 6 | 20.8 | 7.6 | 0.013 | 99.8 | 3.0 | 87.0 | 0.007 | 99.9 |
| 9 | 21.1 | 6.2 | 0.020 | 99.6 | 4.5 | 80.4 | 0.083 | 98.5 |
| 12 | 22.5 | 0 | 0.033 | 99.4 | 3.6 | 84.3 | 0.024 | 99.6 |
| 24 | 18.1 | 19.6 | 0.458 | 91.4 | 3.0 | 87.0 | 0.019 | 99.6 |
| 28 | 22.0 | 2.2 | 0.460 | 91.3 | 2.7 | 88.3 | 0.011 | 99.8 |

As is evident from table 6 the permeable porous composite according to the invention has in the long run a higher capacity of removal of arsenic as compared to the comparative example. After 24 hours the ability for the comparative material to reduce As is going down whereas such tendency is not noticed for the composite according to the invention. The capacity for removal of nitrate is about 80-90% for the inventive material whereas the non porous iron powder having a carbon content of 3% by weight dissolved in the iron matrix removes nitrate to a limited extent.

Example 5

This example shows how to determine the degree of locking for a permeable porous composite according to the invention.

A porous iron powder was mixed with different functional ingredients, 2% by weight of AC, 1% by weight of graphite A and 2% by weight of graphite B, respectively, for 20 minutes. Standard sieve analysis were performed on the permeable porous composite and content of carbon was measured in the different fractions. When the finer functional ingredient is well distributed and locked into the pores of the porous iron the relative content of functional ingredient in the different fractions shall be as close as possible to the percentage of total material in the fractions. By dividing the content of functional material in a sieve interval with the total content of functional ingredient, a measure of degree of distribution and locking is obtained. In order to achieve a sufficient distribution and locking of the functional ingredient this measure, relative distribution shall be between 1.50 and 0.50 for intervals containing more than 5% by weight of the permeable porous composite. Furthermore, the amount of functional material in the finer fraction, less than 0.075 mm, shall not exceed 30%, preferably not exceed 20% of the total amount of functional material.

The porous iron powder used had a Fe content of minimum 97% by weight, a carbon content below 0.1% by weight, an apparent density of 1.3 g/cm$^3$. 46.8% by weight was above 0.250 mm, 30.9% by weight above 0.150 mm, 13.8% by weight above 0.075 mm and the rest, 8.5% by weight below 0.075 mm.

The following table 7 shows the sieve analysis of the different permeable porous composite and also the content of carbon in the different sieve fractions.

TABLE 7

| | Added 2% AC | | | | Added 1% graphite A | | | | Added 1% graphite B | | | |
|---|---|---|---|---|---|---|---|---|---|---|---|---|
| | % by weight of comp | % C by weight | Distrib. of C in fractions % | Relative distrib. of C | % by weight of comp | % C by weight | Distrib. of C in fractions % | Relative distrib. of C | % by weight of comp | % C by weight | Distrib. of C in fractions % | Relative distrib. of C |
| Total | 100 | 1.91 | 100.0 | 1 | 100 | 0.98 | 100 | 1 | 100 | 1.99 | 100.0 | 1 |
| +0.250 mm | 48.6 | 1.59 | 40.5 | 0.83 | 47.6 | 0.88 | 42.7 | 0.89 | 47.3 | 1.55 | 36.9 | 0.78 |
| +0.150 mm | 28.5 | 2.06 | 30.7 | 1.08 | 27.7 | 0.96 | 27.2 | 0.98 | 29.4 | 2.23 | 32.9 | 1.12 |
| +0.075 mm | 14.2 | 2.36 | 17.5 | 1.23 | 14.2 | 1.15 | 16.8 | 1.18 | 14.9 | 2.54 | 19.0 | 1.28 |
| −0.075 mm | 8.7 | 2.48 | 11.3 | 1.30 | 10.5 | 1.24 | 13.3 | 1.27 | 8.4 | 2.65 | 11.2 | 1.33 |

Example 6

Preparation of the Permeable Porous Composite

This example shows how various types of iron powders can be used for production of the permeable porous composite, depending on the method of preparation. Iron powders used and method of production shall be chosen so that the permeable porous composite will have less than 20% by weight below 75 µm, preferably less than 10% by weight below 75 µm as finer porous iron particles may easily be transported away by the flow of water. As functional ingredient 2% of AC was used.

Different types of permeable porous composites were prepared by;
(1) compacting an iron powder into TRS (Traverse Rupture Strength) bars followed by sizing, gently grinding into desired size, thereafter mixed with the functional ingredient,—CSM
(2) compacting an iron powder into TRS bars followed by heat treatment in an atmosphere of nitrogen followed by sizing, grinding into desired size, thereafter mixed with the functional ingredient,—CHSM
(3) mixing the functional ingredient with an iron powder compacting the mixture into TRS bars followed by sizing, gently grinding into desired size,—MCS
(4) mixing the functional ingredient with an iron powder, compacting the mixture into TRS bars followed by heat treatment in an atmosphere of nitrogen followed by sizing, grinding into desired size,—MCHS After compaction, green density, porosity and green strength were measured. Green strength were also measured after heat treatment. Thereafter the samples were sized into desired size, particle size distribution and apparent density were measured on the obtained sized powder.

Green density (GD) was measured by dividing the weight of the sample with the calculated volume.

Green strength (GS), expresses the strength of the porous structure of the composite made, was measured according to ASTM B 312-ISO 3995

Porosity was measured based on green density measurements and the specific density (the density without the porosity) of the material.

Apparent density (AD) was measured using a Hall Flow meter. Specific surface area (SSA) was measured according to the BET method.

TABLE 8

Preparation of different types of composites and their efficiency in nitrate reduction

| Process step | Production method | 1- CSM | 3- MCS | 2- CHSM | 4- MCHS | 2- CHSM | 4- MCHS | 2- CHSM | 4- MCHS |
|---|---|---|---|---|---|---|---|---|---|
| Raw iron material | Iron powder | Porous | Porous | Porous | Porous | Porous | Porous | Non porous | Non porous |
| | % Fe | min 97 | min 97 | min 97 | min 97 | min 98 | min 98 | min 99 | min 99 |
| | % C | max 0.1 | max 0.1 | max 0.1 | max 0.1 | max 0.1 | max 0.1 | max 0.1 | max 0.1 |
| | AD g/cm$^3$ | 1.3 | 1.3 | 1.8 | 1.8 | 2.4 | 2.4 | 3 | 3 |
| | +0.850 mm % wt | 0 | 0 | 0 | 0 | 0 | 0 | 0 | 0 |
| | +0.250 mm % wt | 46.8 | 46.8 | 0 | 0 | 0 | 0 | 0 | 0 |
| | +0.150 mm % wt | 30.9 | 30.9 | 4.9 | 4.9 | 1.3 | 1.3 | 7.6 | 7.6 |
| | +0.075 mm % wt | 13.8 | 13.8 | 50.2 | 50.2 | 45.3 | 45.3 | 37.2 | 37.2 |
| | −0.075 mm % wt | 8.5 | 8.5 | 44.9 | 44.9 | 53.4 | 53.4 | 55.2 | 55.2 |
| | SSA m$^2$/g | 0.23 | 0.23 | 0.2 | 0.2 | 0.12 | 0.12 | 0.05 | 0.05 |
| Mixing process | % AC | 0 | 2 | 0 | 2 | 0 | 2 | 0 | 2 |
| | Time min | 0 | 20 | 0 | 20 | 0 | 20 | 0 | 20 |
| Compaction - process & material | Compaction Pressure psi/MPa | 25000/172 | 25000/172 | 30000/206 | 30000/206 | 30000/206 | 30000/206 | 30000/206 | 30000/206 |
| | GD g/cm$^3$ | 4.68 | 4.42 | 4.96 | 4.86 | 5.42 | 5.35 | 5.76 | 5.70 |
| | Porosity % | 40.5 | 43.8 | 37.0 | 38.2 | 31.1 | 32.0 | 26.8 | 27.6 |
| | GS psi/N/mm$^2$ | 4300/30.1 | 3810/26.7 | 1500/10.5 | 1100/7.7 | 1600/11.2 | 580/4.1 | 900/6.3 | 580/4.1 |
| Heat treatment - process & material | Temprature ° C. | 21 | 21 | 538 | 900 | 538 | 900 | 538 | 900 |
| | GS after heat treatment psi/N/mm$^2$ | 4300/30 | 3810/26 | 3960/27.7 | 4660/32.6 | 3120/21.8 | 990/6.9 | 2890/20.2 | 930/6.5 |
| Sizing process | Grinding | yes | yes | yes | yes | yes | yes | yes | yes |
| Mixing process | % AC | 2 | 0 | 2 | 0 | 2 | 0 | 2 | 0 |
| | Time min | 20 | 0 | 20 | 0 | 20 | 0 | 20 | 0 |
| Final product - Sized material | composite | porous | porous | porous | porous | porous | porous | porous | porous |
| | % C | 2 | 2 | 2 | 2 | 2 | 2 | 2 | 2 |
| | AD g/cm3 | 1.29 | 1.37 | 1.56 | 1.48 | 1.98 | 1.88 | 2.78 | 2.88 |
| | +0.250 mm % wt | 72 | 68 | 73.4 | 91.1 | 51.9 | 63.7 | 66.2 | 56 |
| | +0.150 mm % wt | 14.1 | 17.2 | 3.3 | 1.9 | 5.4 | 8.1 | 6 | 10.2 |
| | +0.075 mm % wt | 12.4 | 10.3 | 15.8 | 5 | 29.9 | 22.6 | 18.6 | 23.7 |

TABLE 8-continued

Preparation of different types of composites and their efficiency in nitrate reduction

| Process step | Production method | 1- CSM | 3- MCS | 2- CHSM | 4- MCHS | 2- CHSM | 4- MCHS | 2- CHSM | 4- MCHS |
|---|---|---|---|---|---|---|---|---|---|
| | −0.075 mm % wt | 1.5 | 4.5 | 7.5 | 2 | 12.3 | 5.6 | 9.2 | 10.1 |
| | SSA m$^2$/g | 12.8 | 12.8 | 12.8 | 12.8 | 12.8 | 12.8 | 12.8 | 12.8 |
| Efficiency | Hours | | | | Nitrate (N) mg/l | | | | |
| tests | 0 | 22.4 | 22.4 | 22.4 | 22.4 | 22.4 | 22.4 | 22.4 | 22.4 |
| (Nitrate | 6 | 9.6 | 10.1 | 12.2 | 10.5 | 9.8 | 11.0 | 13.5 | 12.7 |
| reduction) | 12 | 1.7 | 2.3 | 1.5 | 1.6 | 2.0 | 2.1 | 2.5 | 2.4 |
| | 24 | 1.2 | 1.0 | 1.1 | 1.2 | 0.9 | 1.5 | 1.4 | 1.6 |

Table 8 shows that permeable porous composites according to the present invention may be produced according to various methods.

For example non porous iron powder can be turned into a permeable porous composite having a porosity above 25%, giving sufficient permeability to the contaminated fluid or liquid. For example non porous iron powder can also be turned into a porous iron powder or structure.

Finer iron powder can also be used be for producing the permeable porous composite with a particle size distribution substantially less than 20% by weight being less than 75 μm. If more than 20% by weight of the permeable porous composite is less than 75 μm the composite will be less effective as the finer fraction tends to be carried away by the liquid.

In order not to disintegrate after processing it is believed that the green strength of the compacted material should exceed 500 psi, a criterion which is fulfilled by all examples of example 6.

Example 7

This example shows how the minimum required porosity for the permeable porous composite was measured. Three different iron powders, suitable to be used for producing the permeable porous composite, and two different permeable porous composites according to the invention was tested. The test equipment as according to FIG. 3.

The iron powders and the composites were compacted into different green densities. The permeable porous composites were manufactured according to embodiment (3) disclosed earlier.

The materials to be tested were placed in the column and water was passed. The amount of water penetrating through the test material was measured as ml water after 5 minutes.

The following table 9 shows that the porosity of the permeable porous composite has to be more than about 11%. This is evident by test 1 and 2. At a porosity of 9.7% no water passes through the composite at any applied pressure (test 2). At a porosity of 12.8% water passes through the composite at a minimal pressure of 5 psi (0.03 MPa), thus the porosity needed has to be above about 11%.

TABLE 9

| | | Test 1 | Test 2 | Test 3 | Test 4 | Test 5 | Test 6 |
|---|---|---|---|---|---|---|---|
| Iron powder | | Non porous | Non porous | Porous | Porous | Porous | Porous |
| | % Fe | min 99 | min 99 | min 98 | min 97 | min 97 | min 97 |
| | % C | max 0.1 | max 0.1 | max 0.1 | max 0.1 | max 0.1 | max 0.1 |
| | AD g/cm$^3$ | 3 | 3 | 2.4 | 1.3 | 1.3 | 1.3 |
| | +0.850 mm % wt | 0 | 0 | 0 | 0 | 0 | 0 |
| | +0.250 mm % wt | 0 | 0 | 0 | 46.8 | 46.8 | 46.8 |
| | +0.150 mm % wt | 7.6 | 7.6 | 1.3 | 30.9 | 30.9 | 30.9 |
| | +0.075 mm % wt | 37.2 | 37.2 | 45.3 | 13.8 | 13.8 | 13.8 |
| | −0.075 mm % wt | 55.2 | 55.2 | 53.4 | 8.5 | 8.5 | 8.5 |
| | SSA m$^2$/g | 0.05 | 0.05 | 0.12 | 0.23 | 0.23 | 0.23 |
| | mixing | no | no | no | no | 1% AC | 1% graphite A |
| Compacted | density, g/cm$^3$ | 6.86 | 7.11 | 5.96 | 4.77 | 4.94 | 5.00 |
| material | porosity, % | 12.8 | 9.7 | 24.3 | 39.4 | 37.2 | 36.5 |
| Permeability | time, min | 5.0 | 5.0 | 5.0 | 5.0 | 5.0 | 5.0 |
| test | air pressure, psi/MPa | ml water after 5 minutes | ml water after 5 minutes | ml water after 5 minutes | ml water after 5 minutes | ml water after 5 minutes | ml water after 5 minutes |
| | 0/0 | 0 | 0 | 0 | 0 | 0 | 0 |
| | 5/0.034 | 1 | 0 | 3 | 2 | 2 | 2 |
| | 10/0.069 | 2 | 0 | 5 | 4 | 4 | 4 |
| | 20/0.138 | 3 | 0 | 11 | 9 | 6 | 7 |

The invention claimed is:

1. A porous and permeable composite for treatment of contaminated fluids wherein said composite comprises a body of iron particles and 0.01-10% by weight of at least one functional ingredient, selected from the group consisting of graphite, activated carbon and coke, in free form, distributed and locked in the pores and cavities of the iron body, wherein the iron particles have a particle size range between 20 μm and 5 mm and wherein less than 20% by weight of the iron particles have a size less than 75 μm.

2. A composite according to claim 1, wherein the at least one functional ingredient has a particle size below 20 μm.

3. A composite according claim 1, wherein the iron particles have a content of Fe of more than 90% iron.

4. A composite according to claim 1, wherein said composite has a specific surface area above 0.2 m$^2$/g as measured by BET.

5. A composite according to claim 1, wherein the total amount of the at least one functional ingredient is between 0.05-8% by weight.

6. A composite according to claim 1, wherein the iron particles are porous.

7. A composite according to claim 1, wherein said composite comprises a body of H2-reduced iron powder of porous particles having a particle size range between 45 µm and 850 µm in size and having a Fe-content of at least 90% by weight of the iron powder, and the functional ingredient is chosen from graphite and/or activated carbon.

8. A method of reducing the content of contaminants in a fluid, the method comprising passing said fluid through the permeable composite according to claim 1.

9. Method according to claim 8, wherein said fluid is a water containing fluid.

10. Method according to claim 8, wherein the content of contaminants is selected from the group consisting of nitrate, nitrite, heavy metals, other toxic inorganic substances and toxic organic compounds; or combinations thereof.

11. Method according to claim 8, wherein said fluid is to be used as drinking water.

12. A composite according to claim 1, wherein the at least one functional ingredient has a particle size 0.02-10 µm.

13. A composite according claim 1, wherein the iron particles have a content of Fe of more than 95% iron.

14. A composite according claim 1, wherein iron powder is manufactured from chemical reduction of iron oxides or atomization of molten iron.

15. A composite according claim 1, wherein the composite has a porosity more than about 11%.

* * * * *